United States Patent Office 3,018,652
Patented Jan. 30, 1962

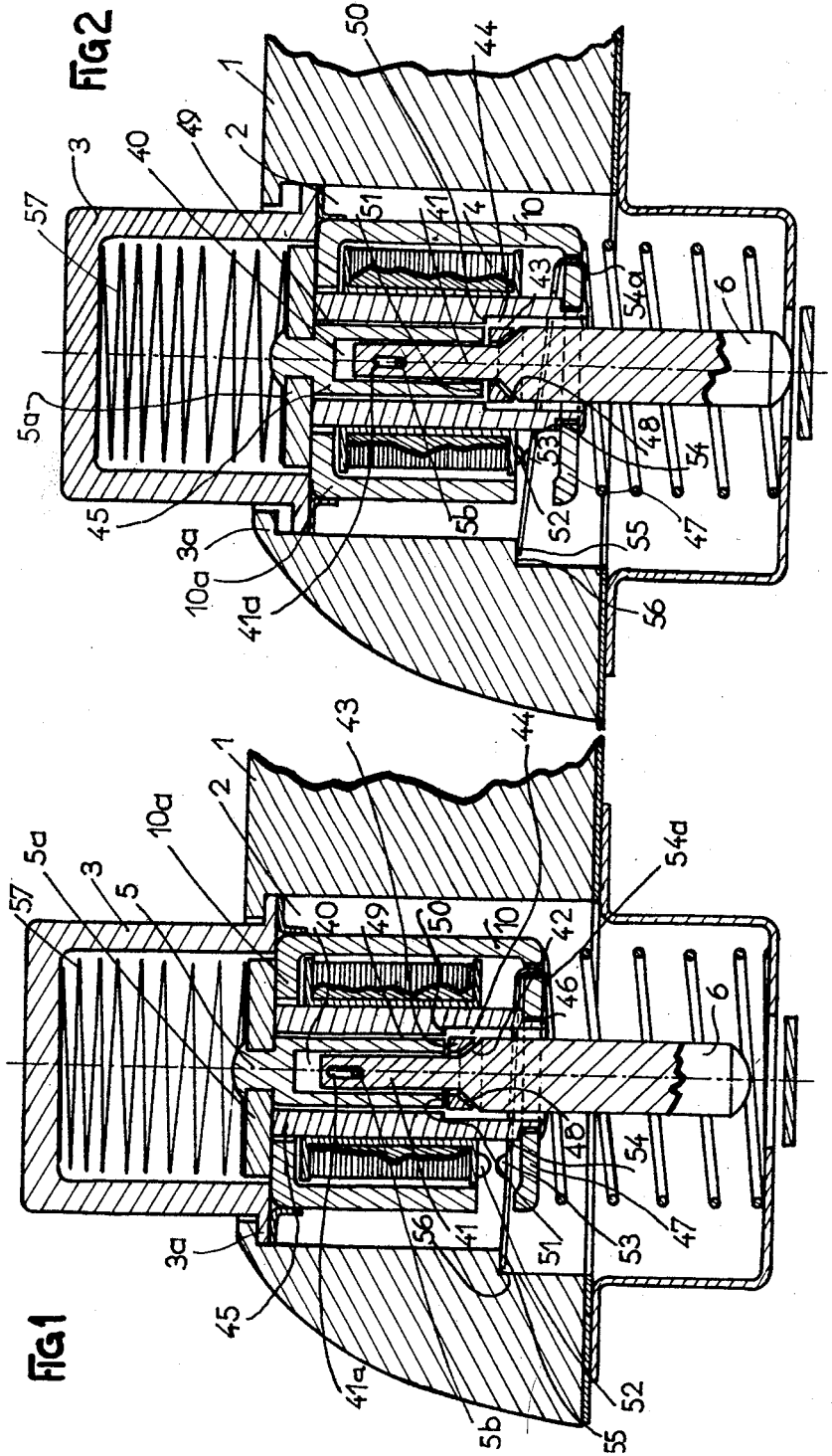

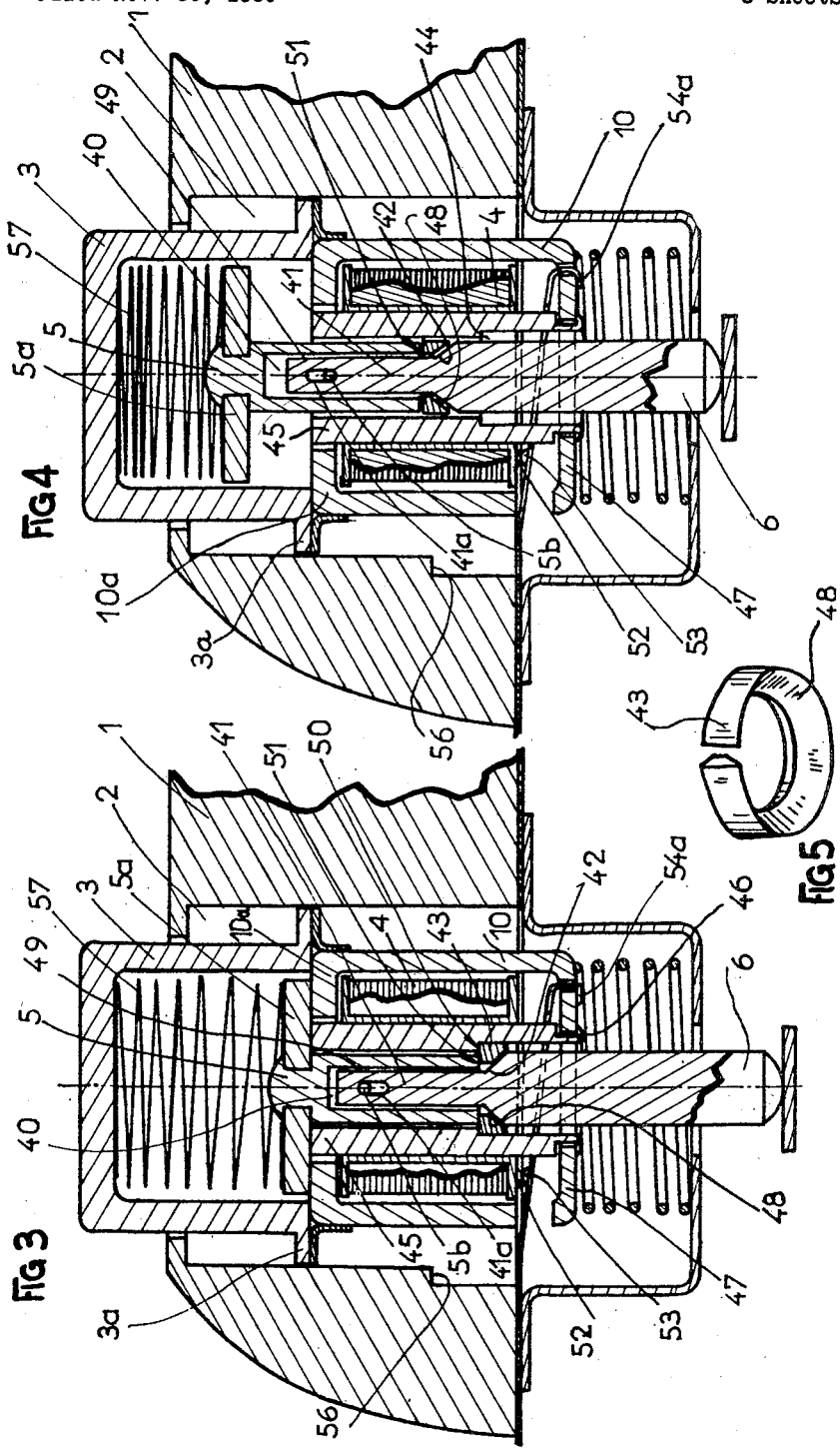

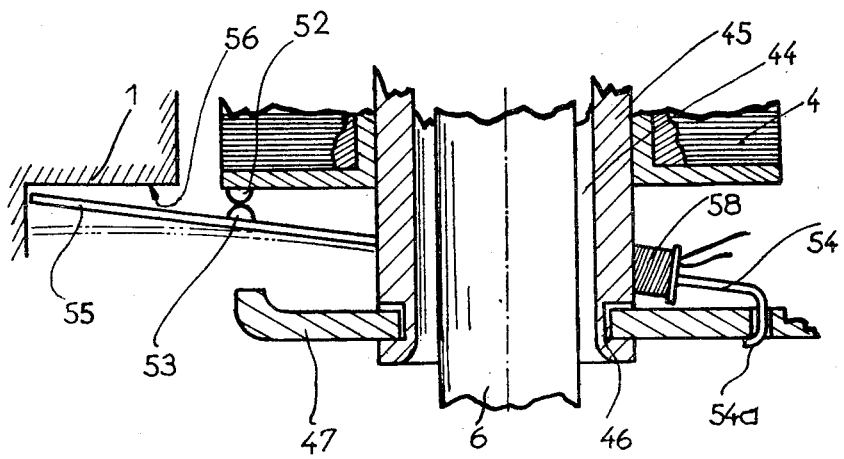
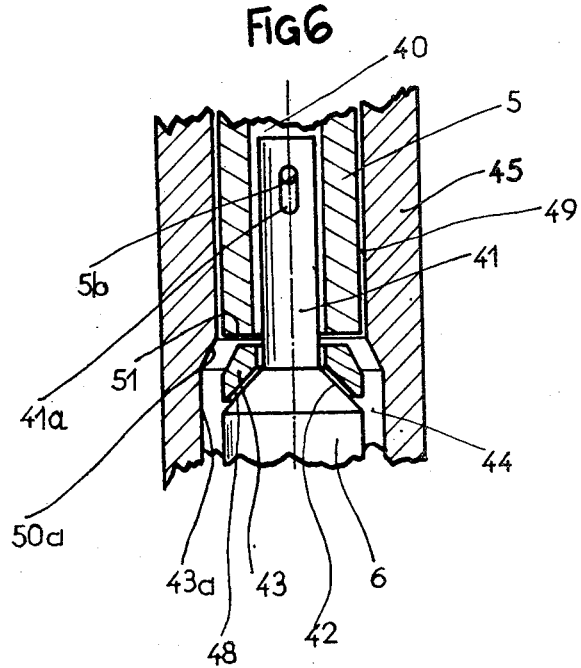

3,018,652
LOCKABLE PUSH-BUTTON ARRANGEMENT
André Dubonnet, Havana, Cuba, assignor to Societe Anonyme pour l'Exploitation de Brevets d'Appareils Electroniques Codelec, Vaduz, Liechtenstein, a body corporate of Liechtenstein
Filed Nov. 30, 1959, Ser. No. 856,275
Claims priority, application France Dec. 3, 1958
11 Claims. (Cl. 70—218)

This invention relates essentially to push-buttons or like sliding control devices of the lockable type for controlling various mechanical components, notably lock bolts.

In a prior U.S. patent application Ser. No. 724,027 filed March 26, 1958 of which the present application is a continuation in part, the applicant has described a push-button acting upon the member to be controlled through the medium of the movable armature of an electromagnet or similar device associated therewith, so that the thrust exerted on said button is transmitted to the member to be controlled by the attraction or like pressure applying the movable armature of the electromagnet against a stationary yoke thereof when the electromagnet winding is energized.

A push-button of this character is extremely advantageous for controlling door locks and like devices notably of automotive vehicles and more generally of any type of locks, but it may give rise to an inconvenience when the actuation of the member to be moved, for example the bolt of a lock, requires a relatively substantial thrust. As a matter of fact, under these conditions the push-button must contain an electromagnet of a force sufficient to produce a magnetic pressure or attraction capable of overcoming the resistance of the member to be controlled, and it is evident that this is likely to lead to large-sized electromagnets difficult to house in a push-button.

On the other hand, considering the same electromagnet but having a sufficient magnetic pull, the simple accidental jamming of a component of the mechanism constituting the lock or other device operatively associated therewith may prevent the normal operation of the push-button by momentarily overcoming the attraction exerted by the electromagnet.

The same drawback may also arise if the operator exerted on the push-button a pressure definitely and abnormally higher than that normally required for its operation.

It is therefore the essential object of this invention to avoid this drawback. To this end, the push-button according to this invention is remarkable notably in that it comprises a movable driving member reponsive to the displacement of the movable armature of the electromagnet and so disposed that, when the pressure exerted on the push-button exceeds a predetermined value, this movable member will provide a mechanical connection between the member to be controlled (or the rod or shank of the push-button) and the stationary yoke of the electromagnet, or a member solid with the electromagnet coil or the push-button itself.

In other words, this arrangement consists in substituting a positive mechanical connection between the push-button and the bolt or like member to be controlled for the magnetic attraction of the electromagnet during part or the whole of the push-button stroke.

According to another feature characterizing this invention, the aforesaid movable driving member is so disposed as to be capable of establishing the said momentary connection at any desired point of the stroke normally accomplished by said movable armature by sticking to the fixed yoke of the electromagnet.

In order to afford a clearer understanding of this invention, of its various advantages and of the manner in which the same may be carried out in practice, reference will now be made to the attached drawings forming part of this disclosure and illustrating diagrammatically by way of example a typical embodiment of the invention.

In the drawings:

FIGURE 1 is a diagrammatic axial section showing the push-button of this invention in its inoperative position;

FIGURE 2 is a similar view showing the push-button in the condition resulting from the closing of the contacts controlling the energization circuit of the electromagnet associated therewith;

FIGURE 3 is a similar view showing the same push-button in its operative position, that is, with the member to be controlled carried along by the push-button and FIGURE 4 is a view similar to FIGURES 1 to 3, showing the push-button in its depressed position but with the electromagnet coil de-energized.

FIGURE 5 illustrates on a larger scale a detail of the device shown in FIGURES 1 to 4.

FIGURE 6 is a fragmentary sectional view of a detail on a larger scale.

FIGURE 7 is a fragmentary sectional view showing a device provided with a bimetallic strip.

In the example illustrated in FIGURES 1 to 4 of the drawings a push-button constructed according to the teachings of this invention comprises an actuator in the form of a button proper 3 provided with a lower outer edge 3a. Button 3 is made of non magnetic material and is partially housed in an orifice 2 of case 1, the latter consisting, for example, of the handle of an automotive door.

This assembly comprises an electromagnet having a coil 4, a yoke or stationary armature 10 connected to the button 3, a push-button shank 5 and a movable armature 5a registering with the poles 10a of the fixed yoke. Both armatures 10 and 5a are made of ferromagnetic material having a low residual magnetism whereas the shank 5 is made of non magnetic material.

In the exemplary form of embodiment illustrated in the drawing the shank 5 is formed in its lower portion with a blind axial orifice 40 having slidably mounted therein the upper portion 41, for example of cylindrical configuration, of the member to be controlled or actuator rod 6. The aforesaid cylindrical portion 41 is provided with an elongated hole 41a engaging a pin 5b solid with the shank 5 and is connected to the body of rod 6 through a frustoconical surface portion 42 constituting the seat of a resiliently deformable ring or like member, for exmaple a split ring 43 shown more in detail in FIGURE 5. This ring 43 interposed between the shank 5 and the frustoconical portion 42 of rod 6 registers with a cavity 44 formed in the inner surface of a tubular member, sleeve or socket 45 made of magnetic material and mounted inside the coil 4 and surrounding the assembly comprising the shank 5 and ring 43 as well as the upper portion of rod 6. This tubular member 45 is rigid with the stationary yoke 10 of the electromagnet (and constitutes the core thereof) or more generally with the button 3, and has its lower portion 46 secured for example on the bottom 47 of this yoke.

As illustrated more in detail in FIGURE 5, the ring 43 is formed with a lower frustoconical face 48 corresponding in shape to the frustoconical shoulder 42 of rod 6. On the other hand, this ring 43 has substantially the same outer diameter as the rods 5 and 6, whereby it may slide, as well as these members, within the central orifice 49 formed in the tubular member 45. Finally, the thickness or width of this ring is such that, when the latter is opened or enlarged it can occupy an intermediate position shown in FIGURE 3 wherein it engages the inner wall of the aforesaid member 45, so as to straddle the shoulder 50 defining this recess and the bottom 51 of shank 5, and consequently ensure a relative "locking" or "keying" of the members 5, 45 and 6 with one another.

The reference numerals 52 and 53 designate the two contacts interposed in the circuit for energizing the electromagnet coil. Said circuit comprises an electric source and a control device of a conventional and known nature forming no direct part of this invention and consisting of a master switch connected to a lock, so that the push-button arrangement can be rendered effective only when the electrical circuit is closed. Preferably said lock is provided with a key to permit the operating of said master switch from the exterior of the vehicle. One contact 52 is carried, for example, by the coil, and the other contact 53 by a resilient strip 54 secured by one end 54a on the bottom 47 of the fixed yoke. This strip 54 engages with its opposite end, in the inoperative position, a wall element 56 of the handle 1 of the push-button so as to be normally held away from the fixed contact 52 when the fixed yoke 10 and the button 3 are in their upper position.

A relatively weak spring 57 is interposed between the member 5a and the bottom of the button 3 for the purpose of constantly urging the armature 5a (even in the inoperative position) toward the pole shoes 10a of yoke 10.

The push-button described hereinabove operates as follows:

Assuming that the circuit for energizing the coil of the electromagnet is connected to the source of current when the operator begins to depress the button 3, the bottom 47 of the fixed yoke 10 is moved slightly away from the wall portion 56 of handle 1, thus allowing the movable contact 53 to bear resiliently against the contact 52 (FIGURE 2); as the coil is now energized the movable armature 5a is caused to stick by magnetic attraction against the fixed armature 10. If no abnormal resistance counteracts the displacement of the control rod 6, the latter will then be carried along downwardly as in the case of the device described in the aforesaid prior patent application Ser. No. 724,027 filed March 26, 1958 by the applicant. If, for any reason, the effort exerted on the button 3 for driving the rod or other member 6 to be actuated exceeds a predetermined value (that is, a limit-value slightly lower than the sticking pressure of the movable armature), the axial pressure or thrust exerted on the ring 43 will force the latter onto its tapered seat so as to become enlarged or open until it engages either the inner wall of member 45 or the shoulder 50, thereby causing this ring to be positively wedged between this member 45 and the rod 6. A mechanical connection is thus provided between these two members, so that the member to be actuated is carried along mechanically by the fixed yoke or the push-button (see FIGURE 3).

When the push-button resumes its upper position, the resilient ring 43 resumes automatically its initial position between the two members 5 and 6.

FIGURE 4 illustrates the push-button in its depressed position, in the absence of any energization of the electromagnet coil. In this case it is clear that the retaining ring 43 does not interfere with the free sliding movement of the rod assembly 5, 6 in the tubular member 45.

Of course, any other key-forming or like movable driving member may be substituted for the split ring 43 described hereinabove, without however departing from the spirit and scope of the invention as set forth in the appended claims.

Moreover, according to a modified form of embodiment shown in FIGURE 6, the above-described locking action produced between the movable armature and the fixed armature may be replaced by a simple braking or semi-locking action by substituting for example a suitably shaped ramp 50a for the shoulder 50, this ramp being engaged in this case by the ring 43 so that the latter will be clamped in the tubular space 49. The ring 43 is preferably provided with an upper frustro-conical face 43a. Thus, the resulting braking effect will provide a stress limiter in case of accidental jamming of the lock or like device in which the push-button of this invention is mounted.

The ring 43 may be made of any suitable and known material such as metal, plastic, rubber or else.

The resilient contact strip 54 may also consist of a bimetallic strip 54a as shown in FIGURE 7; the coil 58 of said bimetallic strip is series connected with the electromagnet coil winding whereby in case of abnormal operation (for example if the push-button were maintained in its depressed condition during several minutes) the electromagnet coil winding will not be deteriorated by overheating, the bimetallic strip 54a being adapted automatically to cut off the energizing circuit after a predetermined time period as shown in dotted lines in FIG. 7.

Of course, the invention should not be limited to the embodiments shown and described herein, as many modifications may be brought thereto without departing from the spirit and scope of the invention as set forth in the appended claims.

What I claim is:

1. In a push-button arrangement for controlling mechanical elements, a handle formed with a hole, a button slidably mounted in said hole and having an inner cavity, an electromagnet coil, a fixed armature integral with said coil and connected to said push-button, a movable armature located in said cavity, said movable armature being when in its rest position in loose contact with said fixed armature whereby the energization of said coil causes said movable armature to be magnetically maintained by said fixed armature, a sleeve member secured to said fixed armature coaxially to said coil, said sleeve member having internal abutment means, a driving member displaceable within said sleeve member and consisting of two rigid portions with a deformable resilient means between said portions, one of said portions being carried by said movable armature, the other portion being in contact with said mechanical elements, said resilient means being adapted to engage said abutment means when the thrust exerted on the button exceeds a predetermined value.

2. A push-button arrangement as claimed in claim 1 wherein said portion carried by the movable armature consists of a shank formed in one of its ends with a blind axial orifice, said other portion consisting of a rod having one of its ends provided with a frustoconical face and being slidably mounted into said axial orifice.

3. A push-button as claimed in claim 2 wherein said deformable resilient means consists of a split ring having a lower frusto conical face engaging the frusto conical face of said rod, said ring being mounted under said shank whereby said shank during its downward movement will exert axial thrust causing said split ring to be widened and to engage said internal abutment means of said sleeve so as to provide a mechanical connection between said shank and said rod.

4. A push button as claimed in claim 3 wherein said fixed armature consists of a yoke having a bottom part disposed at a certain distance from the end of said coil and two arms embracing said coil, the ends of said arms forming the pole means of the electromagnet.

5. A push button as claimed in claim 4 wherein said sleeve member has one of its ends secured to said bottom part, its other end registering with said pole means.

6. A push button as claimed in claim 5 wherein said internal abutment means in said sleeve consists of a shoulder, the distance between said shoulder and the end of the sleeve which registers with said pole means being approximately equal to the length of said shank.

7. A push button arrangement as claimed in claim 1 comprising a first contact integral with said fixed armature and a second contact movable with respect to said first contact during the initial phase of the actuation of said button, said first and second contacts being connected to an energizing circuit for said coil.

8. A push button arrangement as claimed in claim 7 wherein said hole in said handle is provided with a wall element, said second contact being carried by a flexible strip secured in said fixed armature and being adapted, in the inoperative position, to abut against said wall element to keep said second contact away from said first contact.

9. A push button arrangement as claimed in claim 8 wherein said flexible strip consists of a bimetallic strip adapted to break the circuit for energizing the coil after a predetermined time period.

10. A push button arrangement as claimed in claim 1 comprising a return spring for urging said fixed armature together with said button to the position they had before the button was depressed.

11. A push button arrangement according to claim 10 comprising a further return spring located within said inner cavity of the button, for urging said movable armature against said fixed armature, said further return spring being relatively weak with regard to the return spring adapted to urge the fixed armature.

References Cited in the file of this patent

UNITED STATES PATENTS 2,795,127   Gust _____ June 11, 1957